US012603415B2

(12) United States Patent
Liu et al.

(10) Patent No.: US 12,603,415 B2
(45) Date of Patent: Apr. 14, 2026

(54) MOUNTING ASSEMBLY FOR BASE STATION ANTENNA AND BASE STATION ANTENNA SYSTEM

(71) Applicant: Outdoor Wireless Networks LLC, Claremont, NC (US)

(72) Inventors: Maosheng Liu, Suzhou (CN); Zhigang Wang, Suzhou (CN); Fan He, Suzhou (CN)

(73) Assignee: OUTDOOR WIRELESS NETWORKS LLC, Richardson, TX (US)

(*) Notice: Subject to any disclaimer, the term of this patent is extended or adjusted under 35 U.S.C. 154(b) by 110 days.

(21) Appl. No.: 18/599,278

(22) Filed: Mar. 8, 2024

(65) Prior Publication Data

US 2024/0339752 A1 Oct. 10, 2024

(30) Foreign Application Priority Data

Apr. 4, 2023 (CN) ........................ 202310356693.7

(51) Int. Cl.
*H01Q 1/24* (2006.01)
*H01Q 1/12* (2006.01)

(52) U.S. Cl.
CPC ........... *H01Q 1/246* (2013.01); *H01Q 1/1228* (2013.01); *H01Q 1/1264* (2013.01)

(58) Field of Classification Search
CPC .. H01Q 1/1207; H01Q 1/1228; H01Q 1/1264; H01Q 1/246; H01Q 3/06
See application file for complete search history.

(56) References Cited

U.S. PATENT DOCUMENTS

2019/0174967 A1* 6/2019 Worden, IV ........... A47B 45/00
2021/0367320 A1* 11/2021 Wang .................. H01Q 1/1264

* cited by examiner

*Primary Examiner* — Daniel Munoz
(74) *Attorney, Agent, or Firm* — Myers Bigel, P.A.

(57) ABSTRACT

The present application relates to a mounting assembly for a base station antenna, where the mounting assembly is configured to mount a base station antenna (1), wherein the mounting assembly comprises: a connecting arm (10) provided with a rack (11) having first teeth successive to each other; and a pressure member (12) having at least one second tooth capable of being pressed against the rack such that the second tooth meshes with the rack, wherein a position of the pressure member on the rack when the second tooth meshes with the rack is configured to define a mechanical tilt angle of the base station antenna, wherein the pressure member is releasable from the rack such that the pressure member is displaceable along the rack. The present application also relates to a base station antenna system that includes a base station antenna and the mounting assembly. The mounting assembly enables the mechanical tilt of the base station antenna to be set in a fine division.

20 Claims, 6 Drawing Sheets

MOUNTING ASSEMBLY FOR BASE STATION ANTENNA AND BASE STATION ANTENNA SYSTEM

The present application claims priority from and the benefit of Chinese Application No. 202310356693.7, filed Apr. 4, 2023, the disclosure of which is hereby incorporated herein by reference in full.

TECHNICAL FIELD

The present application relates to a mounting assembly for a base station antenna, and a base station antenna system including the mounting assembly.

BACKGROUND ART

In a wireless communication system, the transmission and reception of signals can be achieved by base station antennas. The base station antenna can be mounted on a pole via a mounting assembly. For example, the pole may be a tower pole of a communication tower, or a rod or analog made of reinforced concrete.

Typically, to mount the base station antenna, an upper mounting assembly and a lower mounting assembly may be used, where the lower mounting assembly can provide a pivot point for the base station antenna, and the upper mounting assembly can have an adjustable effective length, so that the mechanical tilt of the base station antenna can be adjusted by adjusting this effective length. Typically, the effective length of the upper mounting assembly can be discretely adjusted, and thus the base station antenna can have a limited number of selectable mechanical tilts. Typically, in known prior art, these available mechanical tilts may be integer values in degrees. When the base station antenna has a large weight, an intermediate mounting assembly may be additionally provided between the upper mounting assembly and the lower mounting assembly, which additionally connects the base station antenna to the pole.

SUMMARY OF THE INVENTION

The present application aims to provide a mounting assembly for a base station antenna and a base station antenna system including the same, where a fine division of a mechanical tilt of a base station antenna can be realized by the mounting assembly.

A first aspect of the present application relates to a mounting assembly for a base station antenna, where the mounting assembly is configured to mount a base station antenna, in particular to mount the base station antenna to a pole, wherein the mounting assembly comprises:

- a connecting arm provided with a rack having first teeth successive to each other; and
- a pressure member having at least one second tooth capable of being pressed against the rack such that the second tooth meshes with the rack, where a position of the pressure member on the rack when the second tooth meshes with the rack is configured to define a mechanical tilt angle of the base station antenna, wherein the pressure member is releasable from the rack such that the pressure member is displaceable along the rack.

In the prior art known in practice, the mechanical tilt of the base station antenna may have a division of ° an order of magnitude of approximately 1. In contrast, in the case of the mounting assembly according to the present disclosure, each first tooth of the rack may define a finer division, the division may for example be less than 0.5°, or less than 0.4°, preferably in a ° range of 0.1° to 0.3, further preferably 0.1° to 0.2°, for example about 0.10° or 0.15° or 0.20°. The adjustability of the mechanical tilt with such a fine division may be similar to the continuous adjustability of the mechanical tilt, meeting the expectation of the adjustability of the mechanical tilt. In addition, the mounting assembly is mechanically capable of simply, reliably and securely locking any set mechanical tilt.

In some embodiments, the connecting arm may be a U-shaped plate having a base and two side legs.

In some embodiments, the mounting assembly may include a unique connecting arm.

In some embodiments, the mounting assembly may include two or more side-by-side connecting arms.

In some embodiments, the two or more side-by-side connecting arms may be provided with the racks respectively.

In some embodiments, the two side legs may be mirror symmetric, in particular, the entire U-shaped plate may be mirror symmetric.

In some embodiments, each side leg may be provided with the rack and the pressure member. In particular, the configuration of the respective racks and pressure members on the two side legs may be the same, in particular mirror symmetrical to each other.

In some embodiments, each side leg may have a first long hole, the rack is arranged side by side with the first long hole, and the pressure member is capable of being releasably pressed against the rack by a fastener passing through the first long hole.

In some embodiments, each side leg may be equipped with one pressure member and two racks, the two racks are opposite to each other with respect to the first long hole, the pressure member has two sets of second teeth, the number of each set of second teeth is at least one, and each set of second teeth is configured to function together with a corresponding one rack.

In some embodiments, two end portions of the first long hole may be configured to define two endpoint values of a tilt range of the mechanical tilt of the base station antenna.

In some embodiments, the first long hole may extend linearly, and/or the rack may extend linearly.

In some embodiments, the first long hole may extend arcuately, and/or the rack may extend arcuately.

In some embodiments, the first tooth may be a straight tooth, and/or an extension direction of the first tooth may be perpendicular to a longitudinal extension of the rack.

In some embodiments, the first tooth may be an oblique tooth, and/or the extension direction of the first tooth may form an acute angle with the longitudinal extension of the rack.

In some embodiments, the first tooth may have a triangular cross-section or a rectangular cross-section, or may have any other suitable cross-sectional shape.

In some embodiments, the connecting arm may be constructed in a single piece, for example, formed by bending a metal plate.

In some embodiments, the two or more side-by-side connecting arms may each be a planar metal plate member, and the metal plate member may have a long hole and at least one rack, for example, two racks. The long hole and the at least one rack may be disposed side by side, in particular the long hole is disposed between the two racks.

In some embodiments, the pressure member may be a planar plate-like member.

In some embodiments, the pressure member may have a second long hole, and the pressure member is capable of being releasably pressed on the rack by a fastener passing through the second long hole, where the second tooth is opposite to the rack when the fastener is in a first position in the second long hole, and the second tooth exits the rack when the fastener is in a second position in the second long hole away from the first position.

In some embodiments, the pressure member may have a second long hole, and the pressure member is capable of being releasably pressed on the rack by a fastener passing through the second long hole, where when the fastener is in a first position of the second long hole, the two sets of second teeth are opposite to the corresponding rack, and when the fastener is in a second position of the second long hole away from the first position, the two sets of second teeth exit the corresponding rack, where one set of second teeth is between two racks in a region of the first long hole, so that the pressure member is capable of being smoothly displaced along a longitudinal extension of the first long hole.

In some embodiments, each set of second teeth may be one row of second teeth.

In some embodiments, two sets of second teeth may be equally constructed, where the two sets of second teeth have the same number of second teeth.

In some embodiments, two sets of second teeth may have different numbers of second teeth. For example, one set of second teeth may have one unique second tooth or two adjacent second teeth or two spaced apart second teeth, and the other set of second teeth may have one row of second teeth successive to each other.

In some embodiments, the second long hole may extend linearly.

In some embodiments, a longitudinal extension of the second long hole may be perpendicular to a longitudinal extension of each row of second teeth, or form an acute angle with same.

In some embodiments, a surface section of the pressure member between two rows of second teeth may be planar.

In some embodiments, a surface section of the pressure member outside two rows of second teeth may be planar.

In some embodiments, a side of the pressure member having two rows of second teeth may be planar except for the two rows of second teeth.

In some embodiments, two opposite end portions of the second long hole may define the first position and the second position.

In some embodiments, the pressure member may have a counterbore in its side opposite to the second tooth, the counterbore configured to define the first position in a fastened state of the fastener.

In some embodiments, the counterbore may have a circular profile.

In some embodiments, the pressure member together with the second tooth may be constructed in one piece, for example, they may be manufactured by an injection molding process.

In some embodiments, the second teeth may be fixedly connected to the pressure member as separate racks.

In some embodiments, the fastener may include a bolt and a nut matching the bolt.

In some embodiments, the fastener may include a rivet. When the mechanical tilt of the base station antenna is adjusted, the current rivet is first broken and a new rivet is installed after adjusting to a desired mechanical tilt.

In some embodiments, the nut may have a flange, and the counterbore is configured to receive the flange in the fastened state of the fastener, where the nut and thereby the bolt are positioned in the counterbore through the flange.

In some embodiments, the bolt may have a flange, and the counterbore is configured to receive the flange in the fastened state of the fastener, where the bolt is positioned in the counterbore through the flange.

In some embodiments, the flange may have a circular profile.

In some embodiments, the connecting arm may be configured to be pivotally connected to the base station antenna.

In some embodiments, the mounting assembly may further include a clamping device, the clamping device is configured to surround and fasten on a pole, and the connecting arm is connected to the clamping device by the pressure member and a fastener.

In some embodiments, the base may have an open recess configured to provide free space for a pole in the U-shaped plate.

In some embodiments, the pressure member is capable of being translated linearly along the rack in a case of loosening with the rack.

A second aspect of the present application relates to a base station antenna system, including:

- a base station antenna;
- a first mounting assembly configured to pivotally connect the base station antenna and a pole; and
- a second mounting assembly, where the second mounting assembly is the mounting assembly according to the first aspect of the present application, and the second mounting assembly is configured to connect the base station antenna and the pole at a distance from the first mounting assembly in a longitudinal extension of the base station antenna, where the position of the pressure member on the rack defines a mechanical tilt of the base station antenna.

In some embodiments, the second mounting assembly is configured to be mounted above, and the first mounting assembly is configured to be mounted below.

In some embodiments, the base station antenna has an adjustable mechanical tilt in a ° range of 0° to 10.

The above-mentioned technical features, the technical features to be mentioned below and the technical features shown separately in the drawings may be arbitrarily combined with each other as long as the combined technical features are not contradictory. All feasible feature combinations are technical contents clearly recorded herein. Any one of a plurality of sub-features contained in the same sentence may be applied independently without necessarily being applied together with other sub-features.

BRIEF DESCRIPTION OF THE DRAWINGS

The present disclosure will be explained in more detail by means of exemplary embodiments with reference to the attached drawings. Among them.

In the drawings, same reference numerals may refer to same parts or same functional parts.

DETAILED DESCRIPTION OF EMBODIMENTS

Figure 1A:
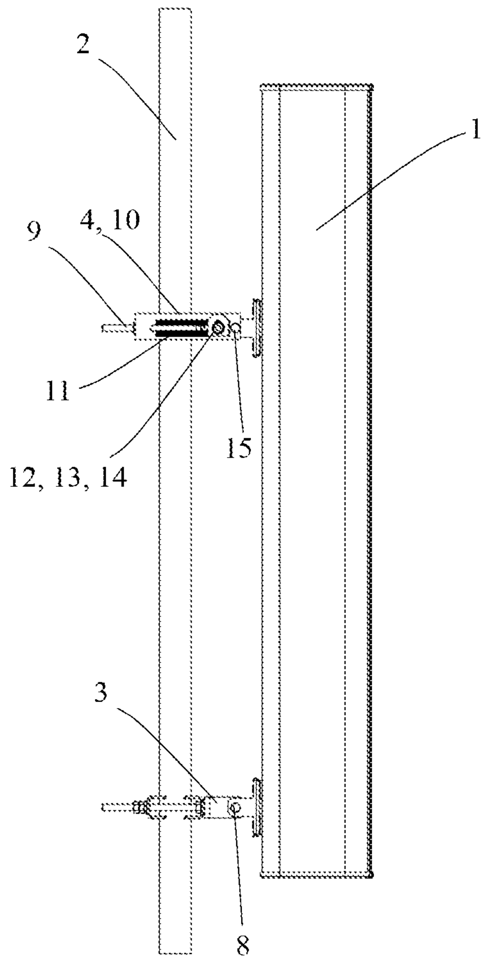
FIGS. 1A and 1B show side and perspective views of a base station antenna system according to an exemplary embodiment of the present disclosure when the base station antenna is at the minimum mechanical tilt.

An exemplary base station antenna system is described in the drawings, where a base station antenna 1 is connected to a pole by means of a lower first mounting assembly 3 and an upper second mounting assembly 4. The second mounting assembly 4 may have an adjustable effective length such that the base station antenna 1 may have an adjustable mechanical tilt. In the states shown in FIGS. 1A and 1B, the base station antenna 1 has the minimum mechanical tilt °, for example, 0, while in the states shown in FIGS. 2A and 2B, the base station antenna 1 has the ° maximum mechanical tilt, for example, 10. The mechanical tilt of the base station antenna 1 may be finely adjustable between the minimum mechanical tilt and the maximum mechanical tilt by following the mounting assembly 4 of the present disclosure. The division of the mechanical tilt realized by the present disclosure may, for example, be less than 0.4°, for example, within a ° range of 0.05°-0.25° or 0.10°-0.20. Furthermore, any set mechanical tilt can be mechanically locked, reliably, and securely locked. In the texts, a mechanical tilt can be understood as an angle between a longitudinal extension and a vertical direction.

The lower mounting assembly 3, also referred to herein as the first mounting assembly, is configured to be pivotally connected to the base station antenna 1 with the pole 2. The mounting assembly 3 provides a pivot point of the base station antenna 1. The mounting assembly 3 includes a clamping device 7 configured to surround and fasten on the pole 2. The clamping device 7 may include a pair of clamping elements that are opposite to each other with respect to the pole 2 and clamp each other with two bolt devices opposite to each other with respect to the pole 2. One of the two clamping elements towards the base station antenna 1 is pivotally connected to a first accessory 5 fixed on the base station antenna 1 by a pair of fasteners 8. Instead of a pair of fasteners 8 each having a shorter bolt, a unique fastener may be employed that has a unique longer bolt running through a pair of mounting holes of the first accessory 5 and a pair of mounting holes of the clamping device 7. An exemplary clamping device 7 is shown in the drawings. A wide variety of clamping devices for fastening on the pole are known in practice and can also be suitably applied in the present disclosure.

The upper mounting assembly 4, also referred to herein as the second mounting assembly, is configured to connect the base station antenna 1 and the pole 2 at a distance from the mounting assembly 3 in a longitudinal extension of the base station antenna 1. The mounting assembly 4 includes a clamping device 9 configured to surround and fasten on the pole 2. The clamping device 9 may include a pair of clamping elements that are opposite to each other with respect to the pole 2 and clamp each other with two bolt devices opposite to each other with respect to the pole 2. One of the two clamping elements towards the base station antenna 1 is connected to the connecting arm 10 by a pair of first fasteners, each first fastener including a bolt 13 and a nut 14 matching the bolt 13. Instead of a pair of first fasteners each having a shorter bolt 13, a unique first fastener may be employed that has a unique longer bolt running through a pair of mounting holes of the clamping device 9 and through the connecting arm 10. The connecting arm 10 is pivotally connected to a second accessory 6 fixed on the base station antenna 1 by means of a pair of mounting holes 23 by using a pair of second fasteners 15. Instead of a pair of second fasteners 15 each having a shorter bolt, a unique second fastener may be employed that has a unique longer bolt running through a pair of mounting holes of the second accessory 6 and a pair of mounting holes 23 of the connecting arm 10. The clamping device 9 may be equally constituted as the clamping device 7.

If at least one mounting interface has been preset in the pole 2, and it has a comparable function as at least one of the two clamping devices 7 and 9, then the at least one of clamping device 7, 9 may be spared.

The connecting arm 10 may be configured as an integral U-shaped plate having a planar base 20 and two side legs 21 perpendicular to the base 20. The U-shaped plate may be formed by bending a metal plate. The base 20 may have an open recess 22 configured to provide free space for the pole 2 in the U-shaped plate to avoid interference between the connecting arm 10 and the pole 2 at the time of adjusting the mechanical tilt of the base station antenna 1.

Each side leg 21 may have a first long hole 24, and the first long hole 24 along with the recess 22 may be punched out of a metal slab prior to bending of the metal slab. The first long hole 24 may extend parallel to a longitudinal extension of the U-shaped plate. The first long hole 24 may extend in particular linearly. Alternatively, the first long hole 24 may also extend arcuately. One rack 11 may be provided on each side of the first long hole 24 of each side leg 21. Advantageously, where the first long hole 24 extends linearly, two matching racks 11 equally extend linearly and may have approximately the same length dimension as the first long hole 24. Also advantageously, when the first long hole 24 extends arcuately, the two matching racks 11 equally extend arcuately and may have substantially the same arc as the first long hole 24, preferably the first long hole 24 and the two equally racks 11 have a common center.

In an embodiment not shown, instead of configuring two racks 11 for each first long hole 24, only one unique rack 11 may be configured for each first long hole 24 at the side of one longitudinal edge of the first long hole 24.

Figure 1B:
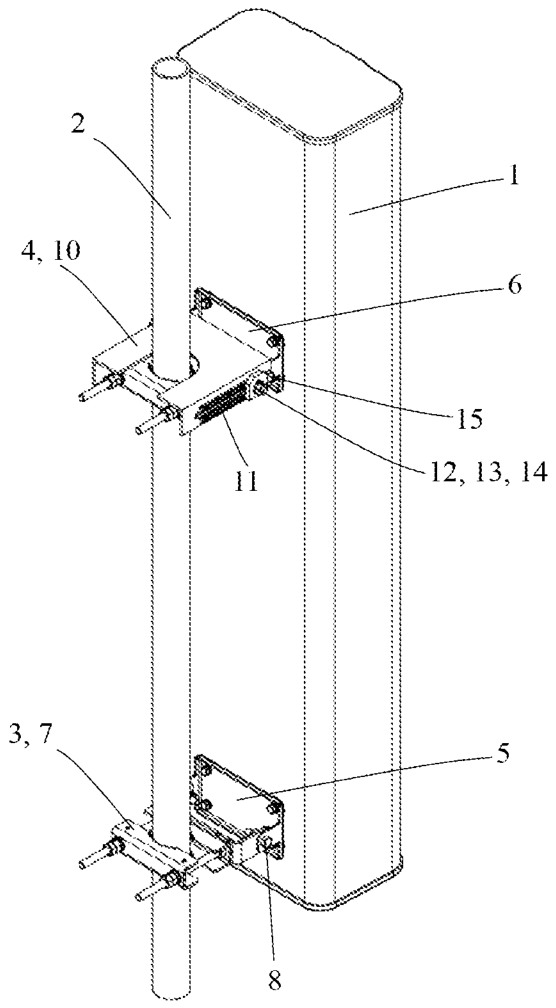
Figure 2A:
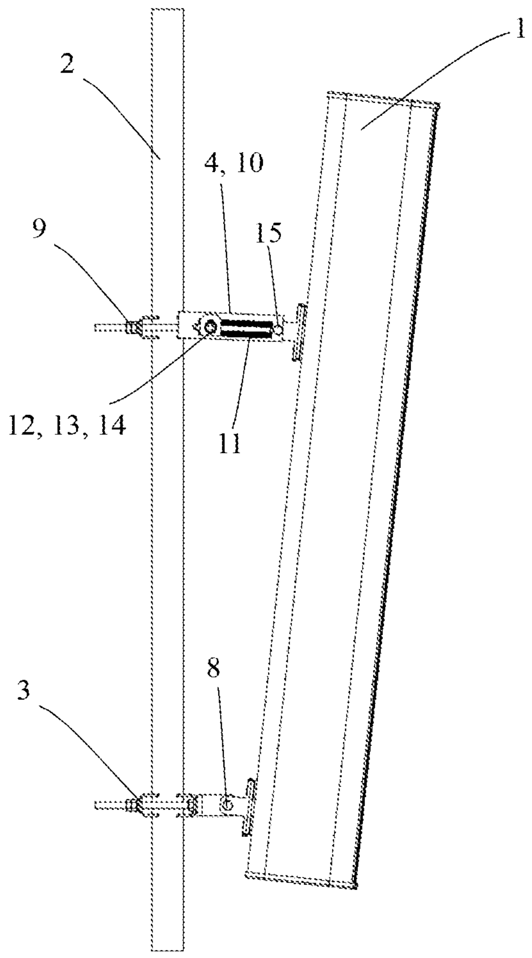
FIGS. 2A and 2B show side and perspective views of the base station antenna system of FIGS. 1A and 1B when the base station antenna is at the maximum mechanical tilt.
Figure 2B:
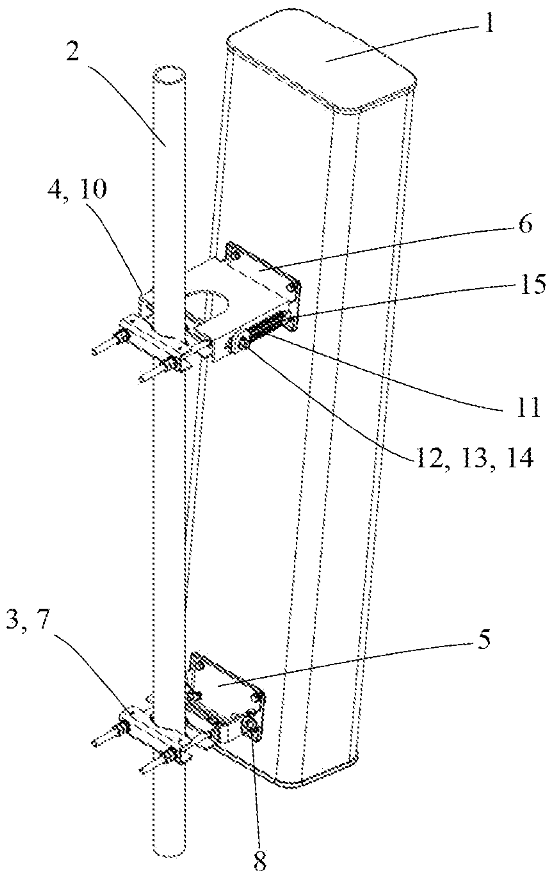
Figure 3A:
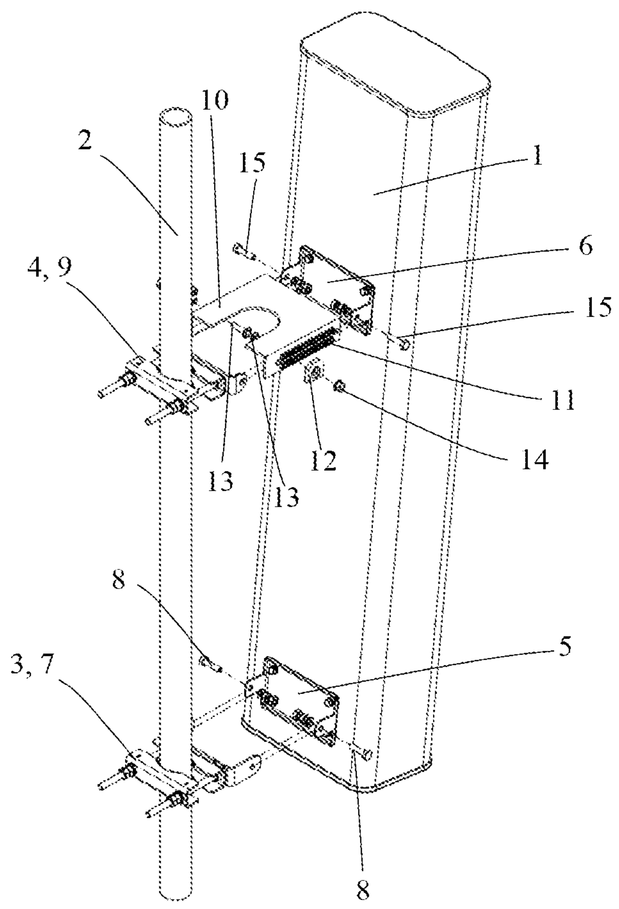
FIGS. 3A and 3B show perspective exploded views and partial enlarged views of the base station antenna system of FIGS. 2A and 2B.
Figure 3B:
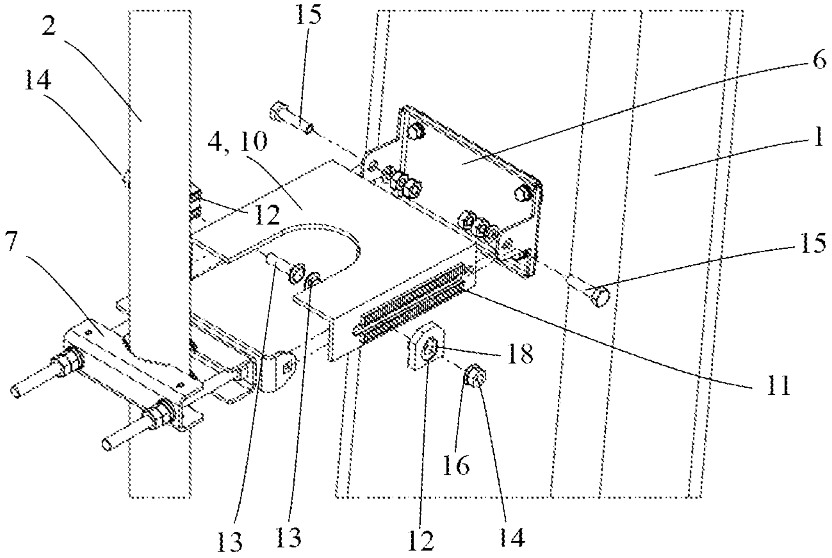

The rack 11 may have first teeth successive to each other, preferably the first teeth may be straight teeth, which may extend in a direction perpendicular to the longitudinal extension of the rack 11. Alternatively, the first tooth may also be an oblique tooth or a herringbone tooth. The first tooth may have any suitable cross-sectional shape, for example may have a triangular, T-shaped or rectangular cross-section. The arrangement structure including one first long hole 24 and two racks 11 on both sides of the connecting arm 10, respectively may be constructed identically. Advantageously, two end portions of the first long hole 24 may be configured to define two endpoint values of a tilt range of the mechanical tilt of the base station antenna 1. As shown in FIGS. 1A and 1B, one end portion of the first long hole 24 towards the base station antenna 1 is configured as one minimum endpoint value for defining a tilt range of the mechanical tilt of the base station antenna 1. As shown in FIGS. 2A and 2B, the other end portion of the first long hole 24 facing away from the base station antenna 1 is configured as another maximum endpoint value for defining the tilt range of the mechanical tilt of the base station antenna 1.

Figure 6A:
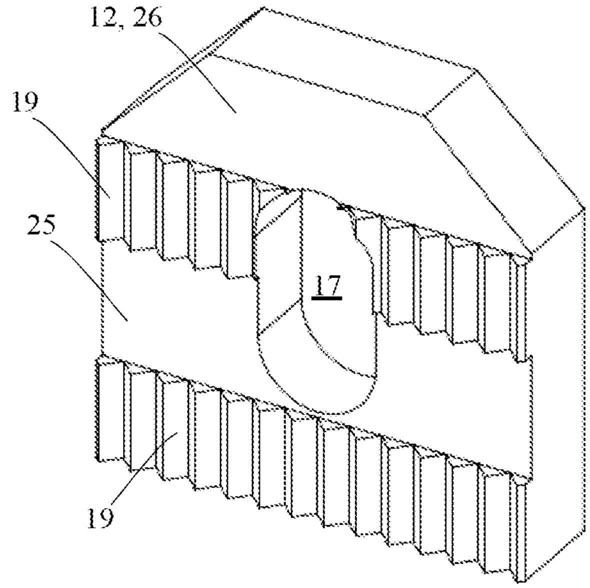
FIGS. 6A and 6B show two different perspective views of a pressure member of the mounting assembly of FIGS. 4A-4C.

Each side leg 21 of the connecting arm 10 may be provided with one pressure member 12. The pressure member may be an integral planar plate-like member. Two pressure members 12 on both sides of the connecting arm 10 may be constructed identically. The pressure member may have at least one second tooth 19. As shown in FIG. 6A, in a preferred embodiment of the pressure member 12, the at least one second tooth 19 is two rows of second teeth 19 parallel to each other, which are integrated in the integral pressure member 12, for example by an injection molding process. Each pressure member 12 can be pressed against two racks 11 disposed on the matching side legs 21 by the first fastener already mentioned above such that the two rows of second teeth 19 mesh with two matching racks 11. When the two second teeth 19 mesh with the two matching racks 11, the position of the pressure member 12 on the rack 11, or the positioning of the pressure member 12 on the side legs 21, is configured to define the mechanical tilt of the base station antenna 1. Upon partial release of the first fastener, the first fastener may be retained in the first long hole 24 of the connecting arm 10 against loss, and the pressure member 12 is capable of being displaced along the rack 11. Then, after the pressure member 12 reaches a desired new position, the first fastener is re-tightened to secure the pressure member 12 in the desired new position relative to the connecting arm 10 (more specifically relative to the rack 11). The new position corresponds to a new mechanical tilt. Assuming that each first tooth of the rack 11 has a division ° of ° a mechanical tilt of approximately 0.15 from a state having a mechanical tilt of 0 as shown in FIGS. 1A and 1B, the base station antenna 1 may now have a mechanical tilt of approximately 1.5 when the pressure member 12 moves by the travel of 10 first teeth to a new position relative to ° the rack 11. The base station antenna 1 may now have a mechanical tilt of approximately 1.8 when the pressure member 12 continues to move by the travel of 2 first teeth to another new position relative ° to the rack 11. Fine adjustment of the mechanical tilt achieved by the embodiments of the present disclosure is close to continuous adjustability of the mechanical tilt. At the same time, by meshing the first tooth with the second tooth, any set mechanical tilt can be mechanically, reliably and securely locked. Typically, a movement of the pressure member with respect to the rack may be achieved in the case where the pressure member is stationary, while the connecting arm having the racks is movable. Alternatively, a movement of the pressure member with respect to the rack may be achieved in the case where the connecting arm having the racks is stationary, while the pressure member is movable. Alternatively, a movement of the pressure member with respect to the rack may also be achieved in the case where both the pressure member and the connecting arm having the racks are movable.

In an embodiment not shown, the rack 11 may be provided with markings and scales about the mechanical tilt. For example, on each side leg 21, for an upper rack of two racks 11, each fifth tooth may be color marked on the upper side of the rack and provided with a corresponding mechanical tilt reading.

The pair of first fasteners already mentioned above may be constituted identically. Each first fastener may include one bolt 13 and one nut 14 matching the bolt 13. The bolt 13 is located inside the connecting arm 10 with its bolt head, and sequentially passes through one matching mounting hole and one matching first long hole 24 of the clamping device 9 with its bolt bar part, and the nut 14 is screwed on the outside of the connecting arm 10.

Figure 4A:
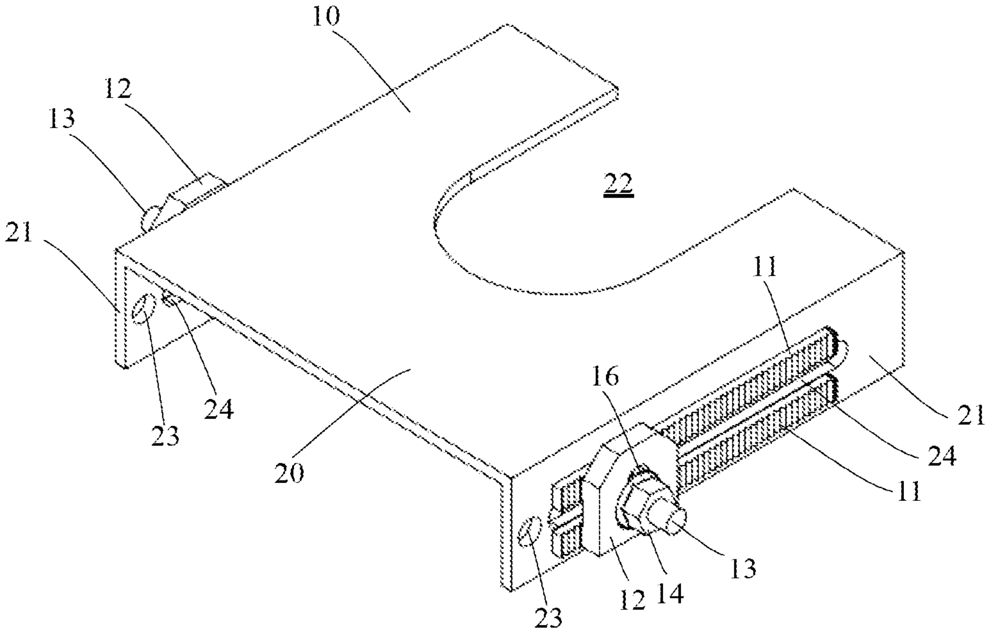
FIGS. 4A-4C show a plurality of perspective views of a portion of a mounting assembly according to an exemplary embodiment of the present disclosure.
Figure 4B:
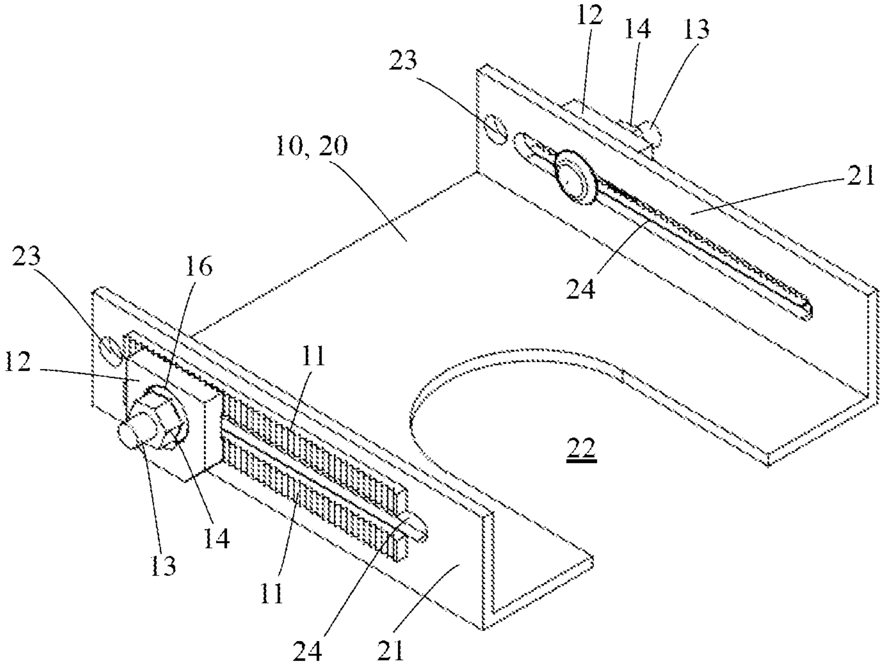
Figure 4C:
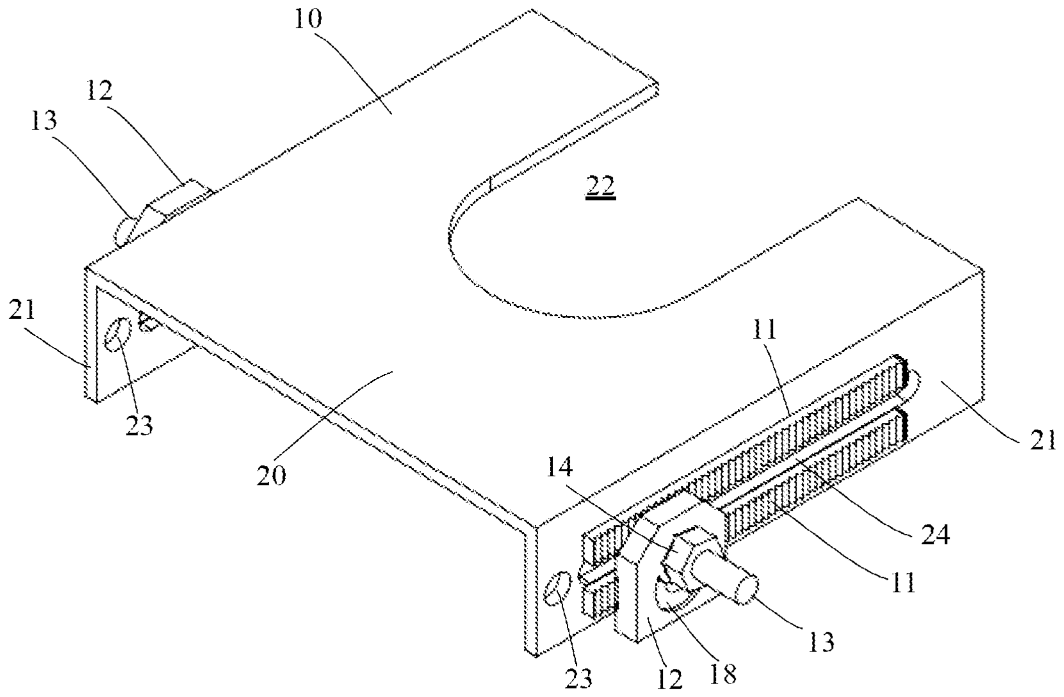
Figure 5:
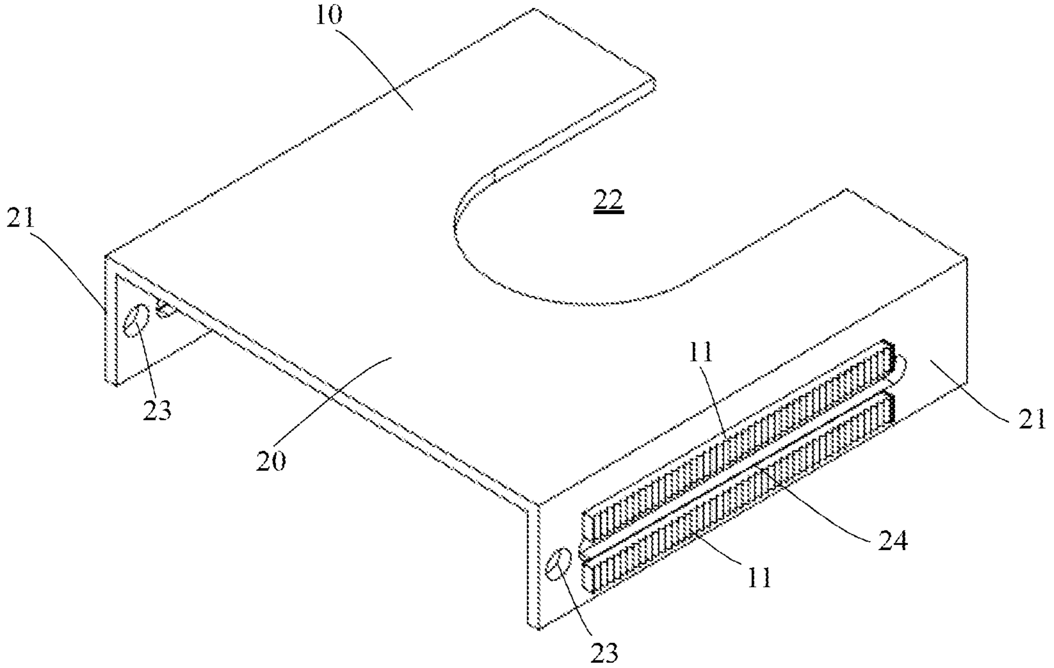
FIG. 5 shows a perspective view of a connecting arm of the mounting assembly of FIGS. 4A-4C.
Figure 6B:
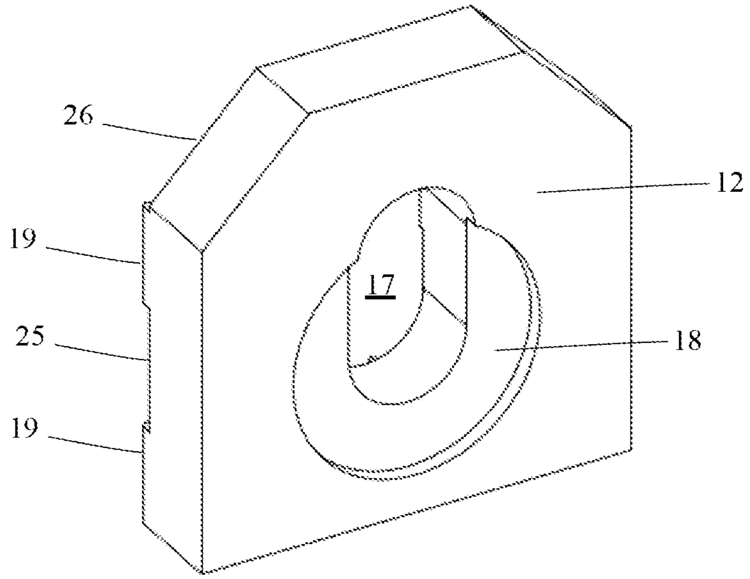

As shown in FIGS. 6A and 6B, the pressure member 12 may have a second long hole 17, and the pressure member 12 can be releasably pressed against the rack 11 by the first fastener (more accurately, the bolt 13 of the first fastener) passing through the second long hole 17. A longitudinal extension of the second long hole 17 may be perpendicular to a longitudinal extension of each row of second teeth 19, and a surface section 25 of the pressure member 12 between two rows of second teeth 19 may be planar. A surface section 26 of the pressure member 12 outside two rows of second teeth 19 may also be planar. As shown in FIGS. 4A and 4B, when the first fastener is at a first position in the second long hole 17 (especially one end portion of the second long hole 17), two rows of second teeth 19 of the pressure member 12 are opposite to two matching racks 11. In the case of tightening the first fastener, the two rows of second teeth 19 of the pressure member 12 mesh with the first teeth of the two matching racks 11, and the pressure member 12 is fastened on the two racks 11 without being displaced along the longitudinal extension of the rack 11, and thus the base station antenna 1 can stably occupy the corresponding mechanical tilt. As shown in FIG. 4C, if the first fastener is partially loosened, the pressure member 12 may move downwards or fall so that the first fastener is now in a second position away from the first position in the second long hole 17 (especially the other end portion of the second long hole 17), and the two rows of second teeth 19 of the pressure member 12 exit the matching racks 11, respectively. Now, the planar surface section 26 of the pressure member 12 adjacent to the upper row of second teeth 19 in FIG. 6B is opposite to an upper rack 11 on the matching side leg 21, the upper row of second teeth 19 of the pressure member 12 is in the region of the first long hole 24 of the matching side leg 21, the planar surface section 25 of the pressure member 12 between the two rows of second teeth 19 is opposite to a lower rack 11 on the matching side leg 21, and the lower row of second teeth 19 of the pressure member 12 is opposite to a planar region of the lower rack 11 on the matching side leg 21. In this case, the pressure member 12 is able to be smoothly displaced along the longitudinal extension of the first long hole 24 of the matching side leg 21, in particular can be translated linearly. When the pressure member 12 reaches a desired new position along the first long hole 24, the pressure member 12 is moved along the second long hole 17 relative to the first fastener such that the first fastener returns from the second position in the second long hole 17 to the first position in the second long hole 17, and then the first fastener is fastened again such that the base station antenna 1 can stably occupy a new mechanical tilt.

Advantageously, the pressure member 12 may have a counterbore 18 in its side opposite to the second tooth 19, the counterbore configured to define the first position in a fastened state of the first fastener. To this end, the counterbore 18 may have a circular profile, while the nut 14 of the first fastener may have a flange 16 which may have a complementary circular profile. Thus, in the fastened state of the first fastener, the counterbore 18 receives the flange 16 such that the nut 14 and thus the bolt 13 are precisely positioned in the counterbore 18 through the flange 16. As shown in FIGS. 4A and 4B, in the first position, the counterbore 18 is substantially completely covered by the nut 14. As shown in FIG. 4C, in the second position, the counterbore 18 is partially exposed and thereby becomes visible.

In an alternative embodiment not shown, the second long hole 17 of the pressure member 12 may be replaced by a circular hole having a diameter corresponding to the diameter of the bolt bar part of the bolt 13. In this case, the first fastener needs to be loosened to a greater extent in order to allow the second tooth 19 to be displaced along the rack 11 while being opposite to the rack 11, and is possibly not displaced smoothly due to the collision of the second tooth with the first tooth.

It should be noted that the terminology used here is only for the purpose of describing specific aspects, and not for limiting the disclosure. The singular forms "a" and "the one" as used herein shall include plural forms, unless the context explicitly states otherwise. It can be understood that the terms "including" and "inclusive" and other similar terms, when used in the application documents, specify the existence of the stated operations, elements and/or components, and do not exclude the existence or addition of one or more other operations, elements, components and/or combinations thereof. The term "and/or" as used herein includes all of any combinations of one or more relevant listed items. In the description of the attached drawings, similar reference numerals always indicate similar elements.

The thickness of the elements in the attached drawings may be exaggerated for clarity. In addition, it can be understood that if an element is referred to as being on, coupled to, or connected to, another element, then the said element may be directly formed on, coupled to, or connected to the other element, or there can be one or more intervening elements between them. Conversely, if the expressions "directly on", "directly coupled to" and "directly connected to" are used herein, it means that there are no intervening elements. Other words used to describe the relationship between elements should be interpreted similarly, such as "between" and "directly between", "attached" and "directly attached", "adjacent" and "directly adjacent" and so on.

Terms such as "top", "bottom", "upper", "lower", "above", "below", etc. herein are used to describe the relationship of one element, layer or region with respect to another element, layer or region as shown in the attached drawings. It can be understood that in addition to the orientations described in the attached drawings, these terms should also include other orientations of the device.

It can be understood that although the terms "first", "second", etc. may be used herein to describe different elements, these elements should not be limited by these terms. These terms are only used to distinguish one element from another. Therefore, the first element can be referred to as the second element without departing from the teachings of the concept of the present disclosure.

It may also be considered that all the exemplary embodiments disclosed herein may be arbitrarily combined with each other.

Finally, it should be pointed out that the aforementioned examples are only used to understand the present disclosure, and do not limit the protection scope of the present disclosure. For those of ordinary skill in the art, modifications can be made on the basis of the aforementioned examples, and these modifications do not depart from the protection scope of the present disclosure.

The invention claimed is:

1. A mounting assembly for a base station antenna, wherein the mounting assembly is configured to mount a base station antenna to a mounting structure, wherein the mounting assembly comprises:

a connecting arm provided with a rack having first teeth successive to each other; and a pressure member having second teeth successive to each other and capable of being pressed against the rack such that the second teeth mesh with the rack, wherein a position of the pressure member on the rack when the second teeth mesh with the rack is configured to define a mechanical tilt of the base station antenna, wherein the pressure member is releasable from the rack such that the pressure member is displaceable along the rack.

2. The mounting assembly for a base station antenna according to claim 1, wherein the connecting arm is a U-shaped plate, the U-shaped plate has a base and two side legs, and each side leg is equipped with the rack and the pressure member.

3. The mounting assembly for a base station antenna according to claim 2, wherein each side leg has a first long hole, the rack is arranged side by side with the first long hole, and the pressure member is capable of being releasably pressed against the rack by a fastener passing through the first long hole.

4. The mounting assembly for a base station antenna according to claim 3, wherein each side leg is equipped with one pressure member and two racks, the two racks are opposite to each other with respect to the first long hole, the pressure member has two sets of second teeth, the number of each set of second teeth is at least one, and each set of second teeth is configured to function together with a corresponding one rack.

5. The mounting assembly for a base station antenna according to claim 4, wherein the pressure member has a second long hole, and the pressure member is capable of being releasably pressed on the rack by a fastener passing through the second long hole, wherein when the fastener is in a first position of the second long hole, the two sets of second teeth are opposite to the corresponding rack, and when the fastener is in a second position of the second long hole away from the first position, the two sets of second teeth exit the corresponding rack, wherein one set of second teeth is between two racks in a region of the first long hole, so that the pressure member is capable of being smoothly displaced along a longitudinal extension of the first long hole.

6. The mounting assembly for a base station antenna according to claim 5, wherein each set of second teeth is one row of second teeth, a longitudinal extension of the second long hole is perpendicular to a longitudinal extension of each row of second teeth, and a surface section of the pressure member between two rows of second teeth is a plane.

7. The mounting assembly for a base station antenna according to claim 3, wherein two end portions of the first long hole are configured to define two endpoint values of a tilt range of the mechanical tilt of the base station antenna.

8. The mounting assembly for a base station antenna according to claim 3, wherein the first long hole extends linearly, and the rack extends linearly.

9. The mounting assembly for a base station antenna according to claim 3, wherein the fastener comprises a bolt and a nut matching the bolt.

10. The mounting assembly for a base station antenna according to claim 2, wherein the base has an open recess configured to provide free space for a pole in the U-shaped plate.

11. The mounting assembly for a base station antenna according to claim 2, wherein the two side legs are mirror symmetrically formed together with matching racks.

12. The mounting assembly for a base station antenna according to claim 1, wherein the first tooth is a straight tooth, and an extension direction of the first tooth is perpendicular to a longitudinal extension of the rack.

13. The mounting assembly for a base station antenna according to claim 1, wherein the pressure member is a planar plate-like member.

14. The mounting assembly for a base station antenna according to claim 1, wherein the pressure member has a second long hole, and the pressure member is capable of being releasably pressed on the rack by a fastener passing through the second long hole, wherein the second teeth are opposite to the rack when the fastener is in a first position in the second long hole, and the second teeth exit the rack when the fastener is in a second position in the second long hole away from the first position.

15. The mounting assembly for a base station antenna according to claim 1, wherein the connecting arm is configured to be pivotally connected to the base station antenna.

16. The mounting assembly for a base station antenna according to claim 1, wherein the mounting assembly further comprises a clamping device, the clamping device is configured to surround and fasten on a pole, and the connecting arm is connected to the clamping device by the pressure member and a fastener.

17. The mounting assembly for a base station antenna according to claim 1, wherein the first tooth is configured to define a division of the mechanical tilt of the base station antenna in a range of 0.1 to 0.3.

18. The mounting assembly for a base station antenna according to claim 1, wherein the pressure member is capable of being translated linearly along the rack in a case of loosening with the rack.

19. A base station antenna system, comprising:

a base station antenna;

a first mounting assembly configured to pivotally connect the base station antenna and a pole; and a second mounting assembly, wherein the second mounting assembly is the mounting assembly according to claim 1, and the second mounting assembly is configured to connect the base station antenna and the pole at a distance from the first mounting assembly in a longitudinal extension of the base station antenna, wherein the position of the pressure member on the rack defines the mechanical tilt of the base station antenna.

20. A mounting assembly for a base station antenna, wherein the mounting assembly is configured to mount a base station antenna, wherein the mounting assembly comprises:

a connecting arm provided with a rack having first teeth successive to each other; and a pressure member having at least one second tooth capable of being pressed against the rack such that the second tooth meshes with the rack, wherein a position of the pressure member on the rack when the second tooth meshes with the rack is configured to define a mechanical tilt of the base station antenna, wherein the pressure member is releasable from the rack such that the pressure member is displaceable along the rack, wherein the connecting arm is a U-shaped plate, the U-shaped plate has a base and two side legs, and each side leg is equipped with the rack and the pressure member, wherein each side leg has a first long hole, the rack is arranged side by side with the first long hole, and the pressure member is capable of being releasably pressed against the rack by a fastener passing through the first long hole, and wherein each side leg is equipped with one pressure member and two racks, the two racks are opposite to each other with respect to the first long hole, the pressure member has two sets of second teeth, the number of each set of second teeth is at least one, and each set of second teeth is configured to function together with a corresponding one rack.

* * * * *